R. B. DOWNER.
MEANS FOR SECURING BOILER TUBES.
APPLICATION FILED JUNE 11, 1914.
1,181,856. Patented May 2, 1916.
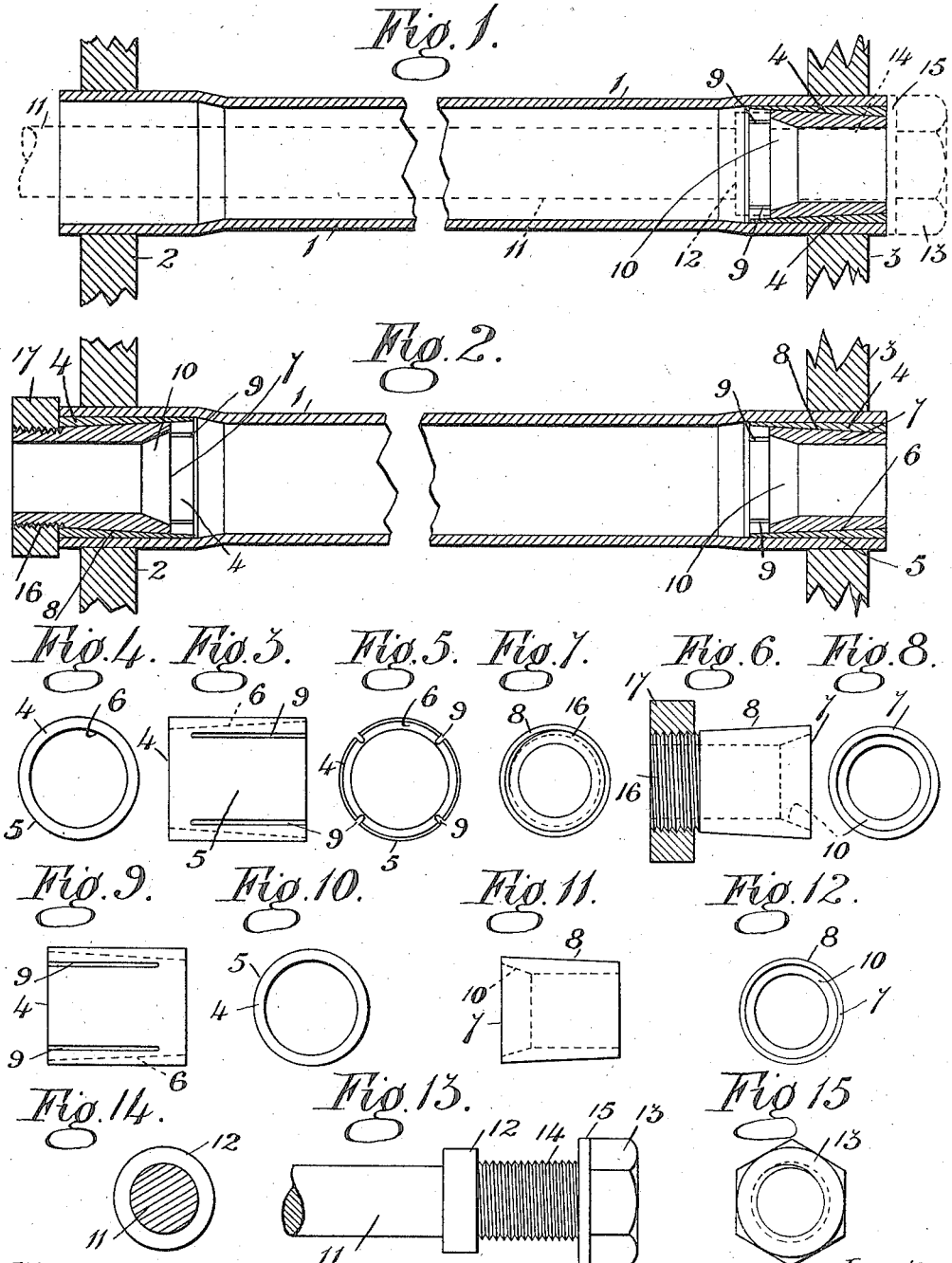

UNITED STATES PATENT OFFICE.

ROBERT B. DOWNER, OF MANOR PARK, ENGLAND.

MEANS FOR SECURING BOILER-TUBES.

1,181,856.  Specification of Letters Patent.  Patented May 2, 1916.

Application filed June 11, 1914. Serial No. 844,573.

*To all whom it may concern:*

Be it known that I, ROBERT BARRON DOWNER, a subject of the King of Great Britain, residing at Manor Park, Essex, England, have invented certain new and useful Improvements in Means for Securing Boiler-Tubes, of which the following is a specification.

This invention relates to improvements in means for securing boiler tubes in tube plates, whereby the disadvantages incidental to the customary method of expanding the tubes by a tapered mandrel and rollers are avoided, and the tubes may be secured in a quicker and more convenient manner without liability of the tube plate becoming damaged, and will be protected from sudden contraction due to up and down pressure in the boiler or forced draft or other cause.

The improved means consist of two ferrules nested one within the other and having their contacting faces coned or tapered at the same angle longitudinally, the outer ferrule having a cylindrical outer face and being of a radially expansible construction, and the inner ferrule being of an unyielding construction.

In use the outer ferrule is fixed and the inner ferrule is adapted to be moved longitudinally into the outer ferrule by being driven or drawn end on, or by a nut adapted to screw on one ferrule and to bear against the other, to cause the inner ferrule to expand the outer ferrule so that the latter has a cylindrical outer face of larger diameter.

In using the improved means to secure the end of a boiler tube in a tube plate, the nested ferrules arranged so that the inner one is not expanding the outer one, are placed within the end of the tube, the outer ferrule fairly fitting the boiler tube and the latter fairly fitting the hole in the tube plate. The inner ferrule is then moved longitudinally as aforesaid without moving the outer ferrule so as to expand the latter and press the walls of the boiler tube end evenly and with an equally distributed pressure radially against the walls of the cylindrical hole in the tube plate, whereby the whole will be locked and jammed securely in position, the ferrules being left within the tube.

The invention is illustrated in the accompanying drawings in which:—

Figure 1 is a longitudinal section of a boiler tube in the course of being secured in position in the tube plates. Fig. 2 is a similar view showing the tube secured in position; Fig. 3 is a side view and Figs. 4 and 5 are respectively end views of the outer ferrule at the left hand or smoke box end of the tube; Figs. 6, 7 and 8 are similar views of the inner ferrule; Figs. 9 and 10, and 11 and 12 are side and end views respectively of the outer and inner ferrules at the right hand or fire box end of the tube; Figs. 13, 14 and 15 are side and end views of a device for operating the ferrules at the right hand end of the tube.

Referring to the drawings, the numeral, 1, indicates the boiler tube.

2 is the smoke box tube plate, and 3 is the fire box tube plate.

4 is the outer ferrule having a cylindrical outer face, 5, and a tapering inner face 6, the thicker end of the ferrule 4 projecting into or through the tube plate 3.

7 is the inner ferrule having its outer face 8, tapering toward the tube plate 3 and of the same angle as the face 6 of the ferrule 4.

The inner ferrule is made of a sufficiently thick gage to resist collapse, and the outer ferrule is made of a sufficiently thin gage to enable expansion radially, and may be interrupted or split longitudinally from its end where the inner ferrule enters toward its outer end, as at 9, or at the other end, or at other parts, to facilitate the expansive action.

If desired, to facilitate the passage of a flue or cleaning brush, one or the other end of the inner ferrule may be bell mouthed or coned at its inner face, as at 10.

The ferrules may be secured by moving the inner ferrule in the direction from the opposite end of the boiler tube toward the end in which the ferrules are. For instance the inner ferrule at the fire box end of the tube may be driven or drawn longitudinally and secured by a mandrel or rod 11, inserted through the smoke box end of the tube, and provided with a fixed flange 12, and a nut 13, engaging a screw-threaded part 14 of the rod. The flange 12, takes a bearing against the inner end of the inner ferrule, *vide* Fig. 1, and the nut 13 takes a bearing against a washer 15, interposed between the nut and the outer end of the outer ferrule and the end of the boiler tube, the rod and nut being afterward removed. Or, the inner ferrule may be provided with a cylindrical screw threaded part 16, which may project through the outer end of the outer ferrule, and a nut 17 may be screwed thereon and bear against the outer end of the outer ferrule and against the end of the boiler tube, and left in position.

What I do claim as my invention and desire to secure by Letters Patent is:—

In combination, a boiler tube plate, means for securing the end of a boiler tube in said plate consisting of two ferrules nested one within the other and having their contacting faces coned or tapered at the same angle longitudinally, said ferrules being received in the end of said tube, the outer ferrule having a cylindrical outer face and being fixed and of a radially expansible construction and the inner ferrule being of an unyielding construction so that by adjustably moving the inner ferrule longitudinally in an appropriate direction relatively to the outer ferrule, the latter has its outer face extended to a larger diameter still of cylindrical form, and means for so adjustably moving the inner ferrule.

In testimony whereof I have hereunto set my hand in presence of two subscribing witnesses.

R. B. DOWNER.

Witnesses:
P. E. MATTOCKS,
FRED HUTCHINS.

Copies of this patent may be obtained for five cents each, by addressing the "Commissioner of Patents, Washington, D. C."